US011153441B1

(12) United States Patent
Tanner (10) Patent No.: US 11,153,441 B1
(45) Date of Patent: *Oct. 19, 2021

(54) SYSTEM AND METHOD FOR RESPONDING TO CUSTOMER CALLS

(71) Applicant: STATE FARM MUTUAL AUTOMOBILE INSURANCE COMPANY, Bloomington, IL (US)

(72) Inventor: Season Arlene Tanner, Deer Creek, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/856,910

(22) Filed: Apr. 23, 2020

Related U.S. Application Data

(63) Continuation of application No. 16/419,177, filed on May 22, 2019, now Pat. No. 10,674,015, which is a continuation of application No. 15/870,338, filed on Jan. 12, 2018, now Pat. No. 10,348,905, which is a continuation of application No. 14/600,698, filed on Jan. 20, 2015, now Pat. No. 9,936,076.

(60) Provisional application No. 62/082,369, filed on Nov. 20, 2014.

(51) Int. Cl.
*H04M 3/523* (2006.01)

(52) U.S. Cl.
CPC ................... *H04M 3/5235* (2013.01)

(58) Field of Classification Search
None
See application file for complete search history.

(56) References Cited

U.S. PATENT DOCUMENTS

| | | |
|---|---|---|
| 2004/0043818 A1 | 3/2004 | Willis |
| 2008/0247525 A1 | 10/2008 | LeBlanc et al. |
| 2012/0122552 A1 | 5/2012 | Youm |
| 2012/0266258 A1 | 10/2012 | Tuchman et al. |
| 2014/0126569 A1 | 5/2014 | Deich et al. |
| 2016/0065739 A1 | 3/2016 | Brimshan et al. |

*Primary Examiner* — Quynh H Nguyen
(74) *Attorney, Agent, or Firm* — Marshall, Gerstein & Borun LLP (57) ABSTRACT

A computer-based system and method for responding to customer calls. The method includes automatically determining whether at least one incoming call meets existing customer criteria and further automatically determining a market segment of the at least one incoming call. The market segment may indicate whether a specific customer prefers: (i) no voice or face-to-face interaction with a representative; (ii) a face-to-face interaction with a representative; and/or (iii) a voice only interaction with a representative. The method further includes automatically routing the at least one incoming call based upon the determined market segment to one of: (1) an automated voice prompt; (2) a gaming system having two-way video capability; or (3) a person-to-person voice call system to facilitate answering incoming calls in a customer-friendly or customer preferred manner.

19 Claims, 3 Drawing Sheets

SYSTEM AND METHOD FOR RESPONDING TO CUSTOMER CALLS

CROSS-REFERENCE TO RELATED APPLICATION

The present application is a continuation of, and claims the benefit of, U.S. patent application Ser. No. 16/419,177, filed May 22, 2019 and entitled "System and Method for Responding to Customer Calls," which is a continuation of U.S. patent application Ser. No. 15/870,338, filed Jan. 12, 2018 and entitled "System and Method for Responding to Customer Calls," which is a continuation of U.S. patent application Ser. No. 14/600,698, filed Jan. 20, 2015 and entitled "System and Method for Responding to Customer Calls" (now U.S. Pat. No. 9,936,076), which claims priority to U.S. Provisional Application No. 62/082,369, filed Nov. 20, 2014, which are all hereby incorporated by reference in their entireties for all purposes.

FIELD OF TECHNOLOGY

The present disclosure relates generally to systems and methods for responding to customer calls and, more particularly, to an improved system and method for routing and responding to customer calls.

BACKGROUND

In a competitive sales market, including insurance sales, independent organizations often field or service customer calls via a call center. The call center may be a unit within the organization or a separate business that the independent organization contracts with to receive customer calls, for example. In any case, the calls to the call centers are typically handled in the same manner: a customer calls the 800 or other designated service number, and a call center representative answers the phone, manually confirms the customer's identity, identifies the purpose of the call, helps the customer, as needed, and then ends the call.

There are several drawbacks to this known call center response method. For example, often a call center representative fails to initially answer the phone, either inadvertently or intentionally, leading to missed opportunities to assist an existing customer or a new customer. In addition, when calls are answered, they may be answered in the same manner, i.e., by a call center representative. The present embodiments may alleviate these and other drawbacks.

BRIEF SUMMARY

One example of the present disclosure includes a computer based-method of responding to customer calls comprising automatically determining, by one or more processors, whether at least one incoming call meets existing customer criteria and automatically determining, by one or more processors, a market segment of the at least one incoming call. The computer-based method may further include automatically routing, by the one or more processors, the at least one incoming call, based upon the determined market segment, to one of: (a) an automated voice prompt; (b) a customer call center gaming system having one or more of two-way video capability; and/or (c) a person-to-person voice call system to facilitate answering incoming calls in a customer-friendly or customer preferred manner. The method may include additional, fewer, or alternate actions, including those discussed elsewhere herein.

Another example of the present disclosure includes a computer-based system of responding to customer calls. The system may include a communication network and one or more computing devices communicatively coupled to the communication network. Each of the one or more computing devices may have a memory and one or more processors. The system may further include a customer call center including one or more of at least one processor, a memory, a transmitter, a receiver, a battery, and/or a gaming system having one or more of two-way video capability, a camera, a speaker, a sensor and/or a 3D scanning system. A module may be stored in the memory of the customer call center and may be executable by at least the customer call center processor to: (1) automatically determine whether at least one incoming call meets existing customer criteria; (2) automatically determine a market segment of the at least one incoming call; and/or (3) based upon the determined market segment, automatically route the at least one incoming call to one of: (a) an automated voice prompt; (b) the customer call center gaming system; or (c) a person-to-person voice call system to facilitate answering incoming calls in a customer-friendly or customer preferred manner. The system may include additional, fewer, or alternate components and functionality, including that discussed elsewhere herein.

Yet another example of the present disclosure includes a system comprising a processor, a computer readable storage medium, and computer-executable instructions stored on the computer readable storage medium and executable by the processor to: automatically determine whether at least one incoming call meets existing customer criteria, automatically determine a market segment of the at least one incoming call, and/or based upon the determined market segment, automatically route the at least one incoming call to one of: (a) an automated voice prompt; (b) a customer call center gaming system having one or more of two-way capability, a camera, a speaker, a sensor, and/or a 3D scanning system; and/or (c) a person-to-person voice call system.

In still yet another example of the present disclosure, a method for responding to customer calls may include automatically determining whether at least one incoming call meets existing customer criteria and automatically determining a market segment of the at least one incoming call is a segment of customers preferring a face-to-face interaction with a representative. The method may further include automatically routing the at least one incoming call to a customer call center XBOX Kinect™ gaming system having two-way video capability without using a controller or headset.

BRIEF DESCRIPTION OF THE DRAWINGS

The Figures described below depict various aspects of the system and methods disclosed therein. It should be understood that each figure depicts an example of a particular aspect of the disclosed system and methods, and that each of the figures is intended to accord with a possible example thereof. Further, wherever possible, the following description refers to the reference numerals included in the following figures, in which features depicted in multiple figures are designated with consistent reference numerals.

There are shown in the drawings arrangements which are presently discussed, it being understood, however, that the present examples are not limited to the precise arrangements and instrumentalities shown, wherein.

The Figures depict preferred examples for purposes of illustration only. One skilled in the art will readily recognize from the following discussion that alternative examples of the systems and methods illustrated herein may be employed without departing from the principles of the invention described herein.

DETAILED DESCRIPTION OF THE DISCLOSURE

The present disclosure is generally directed to a computer-based system and method for responding to customer calls. The method may include automatically determining whether at least one incoming call meets existing customer criteria and automatically determining a market segment of the at least one incoming call. The method may further include automatically routing the at least one incoming call, based upon the determined market segment, to one of: (a) an automated voice prompt; (b) a customer call center gaming system; or (c) a person-to-person voice call system.

In another example, the method may include automatically determining whether at least one incoming caller meets existing customer criteria and automatically determining a market segment of the at least one incoming call is a segment of customers preferring a face-to-face interaction with a representative after calling. The method further includes automatically routing the at least one incoming call to a customer call center XBOX Kinect™ gaming system having two-way video capability without using a controller or headset.

In one aspect, the present examples relate to an enhanced call center process that may: (1) automatically route the customer to a preferred contact method based upon his/her market segment; and/or (2) offer additional methods of interacting with insurance provider agents and/or call center representatives. The enhanced call center process may also involve a telephone call being made by a customer to the insurance provider agent or call center; and as the call comes in to the insurance provider, the telephone number may be automatically looked up by the system to determine whether the customer is new or existing, and/or what market segment that specific customer falls into. The caller (or customer) may hear up to three telephone rings as this look-up and automatic routing is performed (such as the automatic call routing to one of three response methods that is detailed herein).

After which, based upon the caller's market segment, the call may be directed to one of three different response methods. The three response methods may be: (a) automated voice prompts for self-sufficient customers who prefer to take care of things themselves, preferably without talking to anyone; (b) a live, face-to-face call with an insurance provider agent or representative using a gaming system or similar technology; and/or (c) a live, person-to-person call with an insurance provider agent or representative.

For market segment callers that fit into the automated voice prompt response, the caller may be walked through a series of brief prompts that allows him or her to solve his or her own problem quickly and easily without speaking to anyone. For example, after the caller verifies his or her identity via automated prompts, he or she might follow a series of prompts that sends an update on his or her claim status via text or email. Additionally or alternatively, the caller may follow a series of prompts to automatically make an address change on his or her policy or to enroll in a payment plan starting on a certain date or month.

For market segment callers that are technically savvy and/or prefer face-to-face communication on their own terms, connecting with an insurance provider agent or representative via a gaming system may be offered. If accepted, this option may allow the customer and an insurance provider agent or representative to interact with one another face-to-face over the gaming system. The customer may see the person that he or she is talking to, as well as that person's surroundings.

The present examples may include: (1) the use of existing, public data to identify a customer as a new or existing customer and what market segment that the customer falls into; (2) automatic routing of the call to one of three different response methods (a, b, or c described above) based upon the market segment the customer falls into; (3) use of a gaming system or two-way Internet or wireless communication network technology in a new and different environment to assist the customer face-to-face; and/or (4) use of business rules to enable the customer to follow a series of phone prompts and complete the action(s) necessary to resolve his or her own problem or to fulfill his or her own need.

I. Exemplary Computer-Based System

Figure 1:
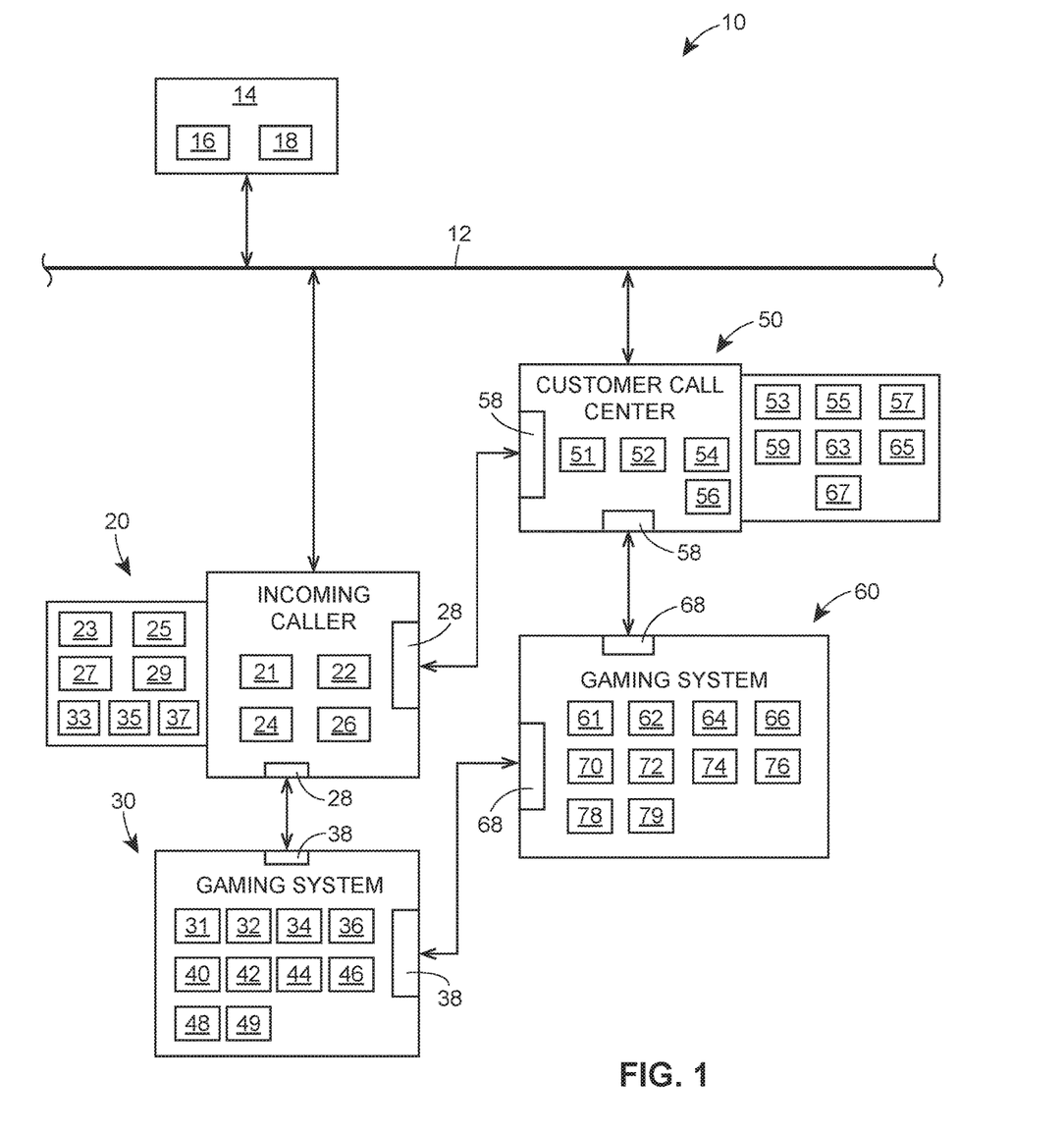
FIG. 1 is a high-level block diagram of an exemplary system for responding to customer calls constructed in accordance with one aspect of the present disclosure.

Referring now to FIG. 1, an exemplary computer-based system 10 for responding to customer calls of the present disclosure is depicted. The system 10 may include a communication network 12 and one or more computing devices 14 communicatively coupled to the network 12. Each of the one or more computing devices 14 may include a memory 16 and/or one or more processors 18.

The system 10 may further include at least one incoming caller apparatus 20. While FIG. 1 depicts one incoming caller apparatus 20, one of ordinary skill in the art will appreciate that more than one or a plurality of incoming caller apparatuses 20 may alternatively be included and still fall within the scope of present claims. As further depicted in FIG. 1, the incoming caller apparatus 20 may include a processor 21, a memory 22, a transmitter 24, a receiver 26, and/or an interface 28, such as a network interface. As one of ordinary skill in the art will further appreciate, the incoming caller apparatus 20 may be a smart phone, a cell phone, a landline phone, a computing device, such as a tablet, a phablet, a desktop computer, a laptop computer, smart glasses, a smart watch, smart bracelet, any other device having technology enabling a telephone call or wireless RF (Radio Frequency) communication to be made, and/or other type of mobile device. Thus, in the smart phone or cell phone example, the incoming caller apparatus 20 may further include one or more of a battery 23, a speaker 25, a microphone 27, a keyboard or keypad 29, and/or a display 33. In the landline phone example, the incoming caller apparatus 20 may further include one or more of a power supply inlet 35 and a cord 37 for connecting to a phone jack (not shown).

The incoming caller apparatus 20 may be communicatively coupled to a gaming system 30, as further depicted in FIG. 1. The gaming system 30 may include one or more of a processor 31, a memory 32, a transmitter 34, a receiver 36, and/or an interface 38, such as a network interface, for communicatively coupling to the interface 28 of the incoming caller apparatus 20, for example. The gaming system 30 of the incoming caller apparatus 20 may further include one or more of a camera 40, a device for enabling two-way video communication 42, a speaker 44, a sensor 46, and/or a 3D scanning system 48. The gaming system 30 may further include an infrared projector 49, which together with the camera 40 and 3D tracking system 48, for example, may track movement of objects and individuals in three (or even two) dimensions.

In one example, the gaming system 30 may be an XBOX Kinect™ or other video gaming system that includes gesture, facial, and/or voice recognition technology without using any controller or headset. In this example, the sensor 46 may be a horizontal bar that is connected to a small base with a motorized pivot (not shown) and designed to be positioned lengthwise above or below the video display (not shown). The sensing range of the sensor 46 may be adjustable, and Kinect (or other gaming system) software may be capable of automatically calibrating the sensor 46 based upon gameplay, and a player's physical environment, accommodating for the presence of furniture or other obstacles, for example.

The system 10 may further include a customer call center 50 that may be communicatively coupled to one or both of the network 12 and the incoming caller apparatus 20. The customer call center 50 may include a processor 51, a memory 52, a transmitter 54, a receiver 56, and an interface 58, such as a network interface, for communicatively coupling to the interface 28 of the incoming caller apparatus 20, for example. As one of ordinary skill in the art will appreciate, the customer call center 50 may be communicatively coupled to the incoming caller apparatus 20 via one or more of a wired connection, a wireless connection, a cellular network, a telecommunications network, and/or a telecommunications line, depending upon the type of incoming caller apparatus 20, for example.

Similar to the incoming caller apparatus 20, and as one of ordinary skill in the art will further appreciate, the customer call center 50 may include a smart phone, a cell phone, a landline phone, a computing device, such as a tablet, a phablet, a desktop computer, a laptop computer, smart glasses, a smart watch, a smart bracelet, any other device having technology enabling a telephone call to be made or a person-to-person voice call system to be formed, any device configured for wired or wireless communication or data transmission, and/or other mobile device(s). Thus, the customer call center 50 may further include one or more of a battery 53, a speaker 55, a microphone 57, a keyboard or keypad 59 and/or a display 63, such as in the smart phone or cell phone, for example, to form a person-to-person voice call system. In addition, the customer call center 50 may further include one or more of a power supply inlet 65 and a cord 67 for connecting to a phone jack (not shown), such as in the landline phone, for example, to also form a person-to-person voice call system.

Also similar to the incoming caller apparatus 20, the customer call center 50 may be communicatively coupled to or include a gaming system 60, as further depicted in FIG. 1. The gaming system 60 may include one or more of a processor 61, a memory 62, a transmitter 64, a receiver 66, and/or an interface 68, such as a network interface, for communicatively coupling to the interface 28 of the incoming caller apparatus 20, for example. The gaming system 60 of the customer call center 50 may further include a camera 70, a device for enabling two-way video communication 72, a speaker 74, a sensor 76, and/or a 2D or 3D scanning system 78. The gaming system 60 may further include an infrared projector 79, which together with the camera 70 and 3D scanning system 78, for example, may track movement of objects and individuals in two or three dimensions.

Like the gaming system 30 of the incoming caller apparatus 20, in one example, the gaming system 60 of the customer call center 50 may be a gaming system, such as an XBOX Kinect™ gaming system, that may include gesture, facial, and/or voice recognition technology without using any controller or headset. The XBOX Kinect™ gaming system 60 may include the same features described above relative to the XBOX Kinect™ gaming system 30, for example.

In addition, while the gaming systems 30, 60 may be XBOX Kinect™ systems, one of ordinary skill in the art will appreciate that the gaming systems 30, 60 may alternatively be one of a WiiU™, Wii™, Nintendo™, or Playstation™ gaming systems, each of which may include gesture, facial and/or voice recognition technology without using any controller or headset, without departing from the scope of the present disclosure.

In one example, the customer call center 50 may be a call center within or a part of an insurance company or other services or goods company. In another example, the customer call center 50 may be an independent entity, separate from the organization for whom it services and routes incoming customer calls, such as an insurance company.

II. Exemplary Process Flow

Figure 2:
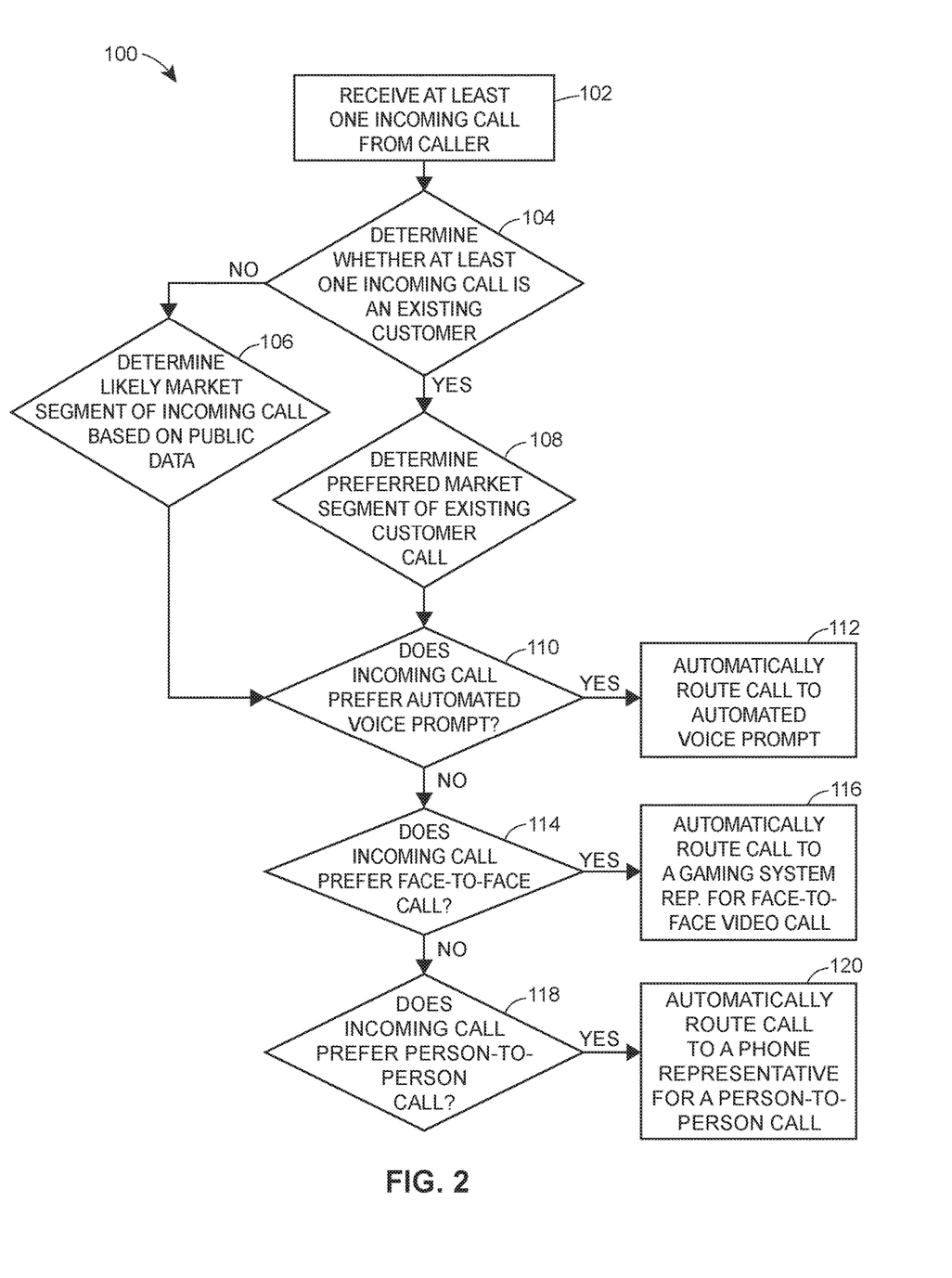
FIG. 2 illustrates an exemplary routine or process flow diagram for responding to customer calls of the system of FIG. 1.

Referring now to FIG. 2, an exemplary routine or process flow diagram 100 that may be implemented by the computer-based system 10 for responding to customer calls of FIG. 1 is depicted. Initially, and in one example, the customer call center 50 may receive at least one incoming call from the incoming caller apparatus 20 (Block 102). More specifically, in one example, the interface 28 of the incoming caller apparatus 20 may communicate with the interface 58 of the customer call center apparatus 50 to receive the incoming customer call.

Next, at least one processor 51 of the customer call center 50 may determine whether at least one incoming call meets existing customer criteria (Block 104). In one example, the processor 51 may determine whether incoming call includes a number associated with an existing customer. If not, the processor 51 may then determine a likely market segment of the incoming call based upon public data, such as public data associated with a telephone number of the incoming call (Block 106). If, however, the incoming call meets existing customer criteria, the processor 51 may determine the preferred market segment of the incoming customer call by automatically querying a database of customer information (Block 108).

The market segment may be a segment for calls and/or customers preferring no voice or face-to-face interaction with a representative after calling. Alternatively, another market segment may be a segment for calls and/or customers preferring a face-to-face interaction with a representative after calling. In yet another example, the market segment may be a segment for calls and/or customers preferring a voice only interaction with a representative after calling.

In one example, automatically determining whether the at least one incoming call meets existing customer criteria (Block 104) may include querying a database of customer information. More specifically, and as noted, the customer call center 50 may be a subset of an organization, such as an insurance company, and, therefore, have access to proprietary customer information. Such information may include various existing customer data, such as customer names, e-mail addresses, telephone numbers, preferred bill payment methods, and/or preferred methods of interacting with an agent of the company, for example.

In this example, the processor 51 of the customer call center 50 may access a database of customer information in the memory 52, for example, of the customer call center 50 or another memory device having the customer information. The processor 51 may then determine whether the incoming telephone number of the incoming call matches a telephone number of an existing customer data in the database. If yes, then the processor 51 may further automatically determine the preferred market segment of the call associated with the existing customer by again querying the database of customer information (Block 108). More specifically, the processor 51 may automatically search the database to retrieve the data profile of the identified existing customer and identify the existing customer's preferred method of interacting with the customer call center 50, e.g., what market segment the existing customer prefers.

In another example, automatically determining whether at least one incoming call meets existing customer criteria may include querying a database of public data (Block 106). More specifically, the customer call center 50 may be hired by an independent organization, such as an insurance company, to field service calls from its customers. However, the customer call center 50 may not be given access to the organization's proprietary database of customer information, for example. In that case, the processor 51 of the customer call center 50 may automatically search a database of public data based upon the telephone number of the incoming call to determine whether the telephone number matches any information revealing or otherwise indicating or suggesting that the call is associated with an existing customer of the organization.

In this example, the processor 51 next may automatically determine that the likely market segment of the at least one call using a first set of business rules based upon public data. The first set of business rules may include at least one or more rules relative to the income level, shopping frequencies, address and type of neighborhood, education level, and/or number of children at the residence of the potential customer associated with the telephone number. The processor 51 may then be able to derive information about the potential customer associated with the telephone number of the incoming call from the public data based upon these rules to predict a likely market segment. In one example, the processor 51 may then search a name associated with the telephone number and public data.

In either case, i.e., whether the processor 51 determines a likely market segment of the incoming call based upon public data or a customer database, the processor 51 may next determine whether the incoming call (or caller) prefers an automated voice prompt (Block 110). If yes, the incoming customer call may be automatically routed, by the processor 51, for example, to an automated voice prompt (Block 112).

In one example, automatically routing the at least one incoming call to an automated voice prompt may include using a second set of business rules. The second set of business rules may allow the at least one incoming call to follow a series of prompts without speaking to any representative. The second set of rules may include one or more rules relating to identification verification, claim status verification, address change or verification, and/or automatic bill payment plan enrollment, for example. More specifically, and in one example, the incoming customer call (or caller) via the second set of business rules may be walked through a series of brief phone prompts that allow the customer associated with the incoming customer call to solve her own problem quickly and easily without talking to anyone.

In this example, the first automated prompt may require the caller to verify her identify. A second automated phone prompt may require the caller to follow a subseries of phone prompts that send an update on her insurance claim status via text or e-mail. A third automated phone prompt may require the caller to follow another series of phone prompts to automatically make an address change to her account, her insurance policy or other product or service, and/or to enroll in an automatic payment plan beginning on a certain date or month.

If, however, the incoming customer call does not prefer the automated voice prompt, the processor 51 may next determine whether the incoming call (or caller) prefers a face-to-face call or interaction (Block 114). If yes, the processor 51 may automatically route the incoming customer call to a representative of the gaming system 60 associated with the customer call center 50 (Block 116). If no, the processor 51 may next determine that the incoming customer call (or caller) prefers a person-to-person call (Block 118) and the processor 51 may automatically route the call to a representative of the customer call center 50 for a person-to-person voice call (Block 120).

When the processor 51 automatically routes the incoming customer call to the representative of the gaming system 60, such as a customer call center representative or an agent associated with the customer call center 50, for a face-to-face interaction, the automatic routing may further include offering an option to connect with the representative of gaming system 60 now (such as immediately or presently). If the offer is accepted, the gaming system 60 of the representative of the customer call center 50 may be automatically connected to the gaming system 30 of the incoming caller apparatus 20, allowing a face-to-face two-way video interaction between the representative and the caller associated with the incoming customer call.

During this interaction, the customer caller may be able to see the representative that she is talking to and the representative's surroundings. This offers the customer call center 50, and/or organization or insurance company associated with the customer call center 50, a distinct business advantage to present a desired image to the customer caller. In one example, the desired image may be a modern, innovative, technically savvy, friendly, forward thinking, and caring company. The image may not be one of their grandparents' outdated insurance shop or a detached cubicle environment that is often imagined or assumed with customer call centers.

For representatives that handle the "Kinect-type" calls, the video interaction or video calls may allow customers to see the agent representative in the agent's office and conduct an in-person meeting despite being in different locations. The representative may be able to highlight his or her ability to take "Kinect-type" calls, encourage certain market segments to connect with him/her, and/or use technology to establish and build a personal relationship with the customer in a manner not previously employed.

III. Another Exemplary Process Flow

Figure 3:
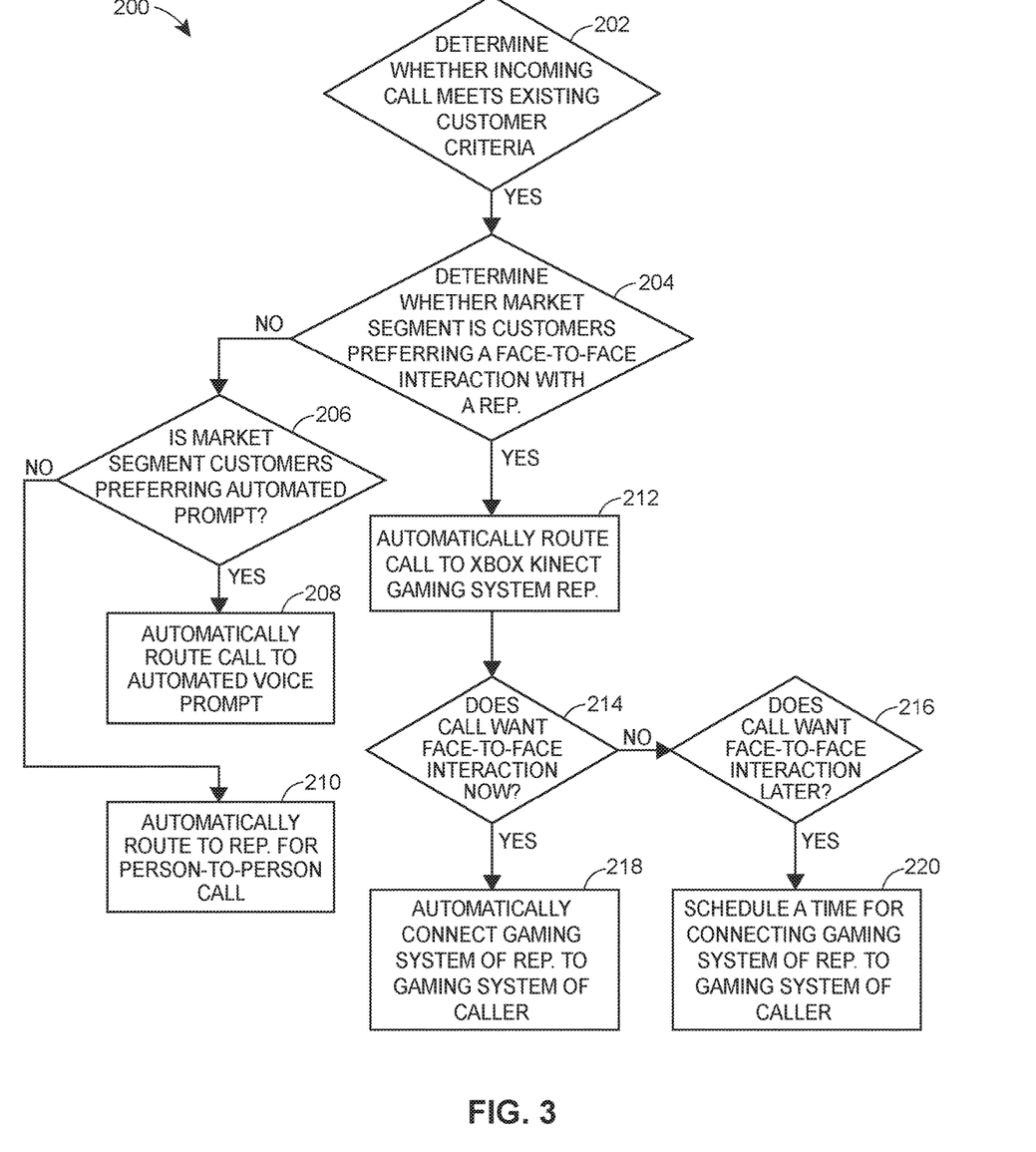
FIG. 3 illustrates another exemplary routine or process flow diagram for responding to customer calls of the system of FIG. 1.

Referring now to FIG. 3, another exemplary routine or process flow diagram 200 that may be implemented by the computer-based system 10 for responding to customer calls of FIG. 1 is depicted. Initially, the processor 51 of the customer call center 50 may determine whether the incoming call meets existing customer criteria (Block 202). If yes, the processor 51 may then determine whether the market segment of the incoming call is customers preferring a face-to-face in interaction with a representative (Block 204).

If no, the processor 51 may next determine whether the market segment of the incoming call is customers preferring an automated prompt response (Block 206). If yes, the processor 51 may automatically route the call to the automated voice prompt (Block 208). If no, however, the processor 51 may assume/determine a person-to-person voice call is preferred, and may automatically route the incoming customer call to a representative for a live, person-to-person voice call (Block 210).

If, however, in Block 204, the processor 51 determines that the preferred market segment for the incoming caller is customers preferring a face-to-face interaction with a representative, the processor 51 may automatically route the call to a representative of an XBOX Kinect gaming system 60 associated with the customer call center 50. It then may be determined whether the incoming call desires a face-to-face interaction now (Block 214) or later (Block 216).

If the incoming call desires a face-to-face interaction now (e.g., presently or immediately), the processor 51 may automatically connect the gaming system 60 of the customer call center 50 to the gaming system 30 of the incoming caller apparatus 20 to allow the face-to-face, two-way video interface call (Block 218). If, however, the incoming call desires a face-to-face interaction later, the representative of the gaming system 60 associated with the customer call center 50 may schedule a time for connecting the gaming system 60 of the customer call center 50 to the gaming center 30 of the incoming caller apparatus 20 (Block 220).

IV. Exemplary Methods

An exemplary computer-based method of responding to customer calls of the present disclosure may include automatically determining, by one or more processors, whether at least one incoming call meets existing customer criteria. The method may further include automatically determining, by the one or more processors, a market segment of the at least one incoming call. The method may further include, based upon the determined market segment, automatically routing, by the one or more processors, the at least one incoming call to one of: (a) an automated voice prompt; (b) a customer call center gaming system having two-way video capability; or (c) a person-to-person voice call system to facilitate answering customer calls in a customer-friendly or customer preferred manner.

In one example, the method may further include automatically routing, by the one or more processors, the at least one incoming call to the customer call center gaming system having two-way video capability, wherein the gaming system is an XBOX Kinect™ system that includes gesture, facial, and voice recognition technology without using any controller or headset. In another example, the method may further include automatically routing, by the one or more processors, the at least one incoming call to the gaming system having two-way video capability, wherein the gaming system is one of a WiiU™, Wii™, Nintendo™, or Playstation System™, each of which includes gesture, facial and voice recognition technology without using any controller or headset.

In yet another example, automatically determining, by the one or more processors, a market segment of the at least one incoming call may include one of automatically determining the market segment is: (1) customers preferring no voice or face-to-face interaction with a representative after calling; (2) customers preferring face-to-face interaction with a representative after calling; or (3) customers preferring a voice only interaction with a representative after calling. Further, automatically determining, by the one or more processors, whether at least one incoming call meets existing customer criteria may include querying a database of customer information and automatically determining, by the one or more processors, a market segment of the at least one call may include querying the database of customer information. Additionally and/or alternatively, automatically determining, by the one or more processors, whether at least one incoming call meets existing customer criteria may include querying a database of public data and automatically determining, by the one or more processors, a market segment of the at least one call using a first set of business rules based upon the database of public data.

In still another example, automatically routing, by the one or more processors, the at least one incoming call to an automated voice prompt may include using a second set of business rules allowing the at least one incoming call to follow a series of prompts without speaking to any representative. In one example, the second set of business rules may include one or more rules relating to identification verification, claim status verification, address change or verification, and automatic bill payment plan enrollment.

In another example, automatically routing, by the one or more processors, the at least one incoming call to the gaming system may further include offering the at least one incoming call an option to connect with the gaming system representative. In addition, the method may include automatically routing, by the one or more processors, the at least one incoming call to the customer call center gaming system, and connecting the customer call center gaming system with a gaming system of the incoming call, allowing a face-to-face video interaction.

Another exemplary computer-based method for responding to customer calls according to another aspect of the present disclosure may include automatically determining, by one or more processors, whether at least one incoming call meets existing customer criteria. The method may further include automatically determining, by one or more processors, a market segment of the at least one incoming call is a segment of customers preferring a face-to-face interaction with a representative after calling. The method may also include automatically routing, by one or more processors, the at least one incoming call to a customer call center XBOX Kinect™ gaming system with a two-way video device without using a controller or headset.

In this example, automatically determining whether at least one incoming call meets existing customer criteria and automatically determining a market segment of the at least one incoming call may include querying a database of customer information. Further, automatically determining, by one or more processors, whether at least one incoming call meets existing customer criteria may additionally or alternatively include querying a database of public data. In addition, automatically determining, by one or more processors, a market segment of the at least one incoming call may include using a first set of business rules based upon the database of public data. Still further, the method may include automatically connecting the customer call center XBOX Kinect™ gaming system with an XBOX Kinect™ gaming system of the incoming call, allowing a face-to-face video call, and/or automatically determining whether the at least one incoming call wants a face-to-face interaction with the gaming system now or a later time.

In one aspect, a computer-implemented method of responding to customer calls in a customer preferred manner may be provided. The method may include: (1) receiving, via or by one or more processors, a wired or wireless communication or data transmission associated with an incoming call from a mobile device or other communications device (smart phone, telephone, laptop, etc.) of a customer or potential customer; (2) analyzing, via or by the one or more processors, the wired or wireless communication or data transmission to determine an identity of the customer or potential customer (such as by using a telephone number of a device from which the incoming call originates, an identification number of the mobile device or other communications device, and/or an IP number of the mobile device or other communications device); (3) based upon the identification of the customer or potential customer, via or by the one or more processors, determining or retrieving a preferred method of interaction associated with that customer or potential customer (or market segment for that customer or potential customer); and/or (4) automatically routing, via or by the one or more processors, based upon the preferred method of interaction, the incoming call to one of: (a) an automated voice prompt; (b) a customer call center gaming system having two-way video capability; or (c) a person-to-person voice call system to facilitate answering customer calls in a customer-friendly or customer preferred manner. The method may include additional, fewer, or alternate actions, including those discussed elsewhere herein.

V. Exemplary Systems

An exemplary computer-based system of responding to customer calls according to the present disclosure may include a communication network and one or more computing devices communicatively coupled to the communication network. Each of the one or more computing devices may have a memory and one or more processors. The system may further include a customer call center having one or more of at least one processor, a memory, a transmitter, a receiver, a battery, and/or a gaming system. The gaming system may have one or more of a two-way video device, a camera, a speaker, and/or a 3D scanning system. In addition, the system may include a module stored in the memory of the customer call center and executable by at least the customer call center processor to: (1) automatically determine whether at least one incoming call meets existing customer criteria; (2) automatically determine a market segment of the at least one incoming call; and (3) based upon the determined market segment, automatically route the at least one incoming call to one of: (a) an automated voice prompt; (b) a customer call center gaming system; or (c) a person-to-person voice call system to facilitate answering incoming calls in a customer-friendly or customer preferred manner.

In one example, the gaming system may be one of an XBOX Kinect™, WiiU™, Wii™, Nintendo™, or Playstation™ system or other system with similar capabilities, and each system may include gesture, facial and voice recognition technology without using any controller or headset. In addition, the market segment may include a segment for: (1) customers preferring no voice or face-to-face interaction with a representative after calling; (2) customers preferring a face-to-face interaction with a representative after calling; and (3) customers preferring a voice only interaction with a representative after calling. Further, the call center processor may automatically determine whether at least one incoming call meets existing customer criteria by querying a database of customer information and may also automatically determine the market segment preferred by the incoming call by querying the database of customer information. Additionally or alternatively, the call center processor may automatically determine whether at least one incoming call meets existing customer criteria by querying a database of public data and may also automatically determine the market segment of the at least one incoming call based upon a first set of business rules using the database of public data.

In another exemplary computer-based system of the present disclosure, the system may comprise processor, a computer readable storage medium, and computer-executable instructions stored on the computer readable storage medium. The computer-executable instructions may be executable by the processor to: (1) automatically determine whether at least one incoming call meets existing customer criteria; (2) automatically determine a market segment of the at least one incoming call; and (3) based upon the determined market segment, automatically route the at least one incoming call to one of: (a) an automated voice prompt; (b) a customer call center gaming system having one or more of two-way video capability, a camera, a speaker, a sensor, or a 3D scanning system; or (c) a person-to-person voice call system to facilitate answering incoming calls in a customer-friendly or customer preferred manner.

In one example, the gaming system may be one or more of XBOX Kinect™, WiiU™, Wii™, Nintendo™, or Playstation™ systems or other system having similar capabilities, each of which includes gesture, facial and voice recognition technology without using any controller or headset. In another example, the market segment may include a segment for: (1) customers preferring no voice or face-to-face interaction with a representative; (2) customers preferring a face-to-face interaction with a representative; and (3) customers preferring a voice only interaction with a representative.

VI. Additional Considerations

In view of the foregoing, one of ordinary skill in the art will understand that the systems and corresponding method and/or methods described above automatically determine: (1) whether at least one incoming call meets existing customer criteria; and/or (2) a market segment of the at least one incoming call using public data or customer information. Based upon the determined market segment, the system 10 and corresponding method and/or methods may then automatically route the at least one incoming call to one of: (1) an automated voice prompt; (2) a gaming system representative to allow for a face-to-face two-way video interaction; and/or (3) a representative for a person-to-person voice call system.

Thus, the system 10 and method and/or methods described, in particular, connecting gaming systems 30, 60 of the customer caller and the call center 50, respectively, enhance human connections between the call center representative (and/or an insurance agent or other insurance provider representative), and the customer. In particular, such a two-way video, face-to-face automatic interaction facilitates the interaction of people to connect, share, learn and act with others. In one example, this interface may allow customers to connect with insurance agents, call centers, and the community. It further may demonstrate the call center's commitment to customers through expanded participation in digital communities, in particular gaming systems many customers enjoy and already use.

Moreover, the systems and method and/or methods described above may simplify interactions between customers and call center representatives, e.g., insurance agents, insurance provider representatives or associates, etc. In one example, customer barriers may be reduced by simplifying and enhancing their online experience, as the effort to do business has been reduced and a digital presence is expanded.

Other benefits of the systems and method and/or methods of the present disclosure may include personalized experiences of the customer. For example, the customers are in control of their products and services because the experience between the customer and the customer call center representative, such as an insurance agent and/or insurance provider representative, may be tailored to their characteristics and/or preferences. In one example, based upon the determined market segment, the incoming call may be routed to one of an automated prompt, a gaming system for a face-to-face interaction, or a voice only call system.

Thus, in view of the foregoing, one of ordinary skill in the art will understand that the system 10, the customer call center 50, and the corresponding methods provide a much faster response time to callers. For example, the customer call center 50 automatically identifies the caller before answering the call, significantly reducing the time previously required by call center systems to manually identify the caller during the call. In addition, the system 10 and methods of the present disclosure also automatically identify the caller's interaction preferences and then automatically route the incoming callers to their preferred manner of interacting with the customer call center before answering the call. This may further reduce the time previously required by other call centers to manually determine a caller's interaction preferences during the call, e.g., via manually searching a database of customer information, for example.

In addition, the system 10, customer call center 50 and corresponding methods of the present disclosure may also provide an increased response quality to callers. In one example, the system 10 and methods may allow the caller's preferred manner of interacting with the company to be determined and then route the caller to the preferred manner of interacting without the need for human interaction between the caller and the customer call center and/or manipulation of any information the caller provides during the call. For example, the processor 51 of the customer call center 50 may automatically determine the caller's preferences for interacting with the customer call center 50 based upon the identified caller data. This may allow the customer call center 50 to respond to the caller according to their preferred manner, significantly increasing the customer call center's 50 response quality and further satisfying and retaining the caller.

Still further, and in one example, automatically connecting the caller's gaming system 30 to the customer call center's gaming system 60 may allow a live, face-to-face video call between the customer call center and the caller, a technical feature not previously offered or even allowed in the prior customer call center systems. Said another way, the system 10 may allow an automatic connection between two gaming systems 30, 60 upon automatically identifying that the incoming caller prefers a face-to-face video call. For example, the processor 51 of the customer call center 50 may automatically instruct the gaming system 60 to connect with the gaming system 30 of the caller after identifying that the caller prefers a face-to-face video call. This again may reduce the response time and increase the response quality of the customer call center.

While several of the foregoing examples refer to a customer call center and/or a customer call center representative, the customer call center may include an insurance company call center and the customer call center representative may include an insurance provider representative and/or insurance agent. Such example methods and systems described above also allow customers to schedule insurance and financial reviews and other meetings, e.g., to obtain a multi-line quote, over a gaming system in an insurance agent's office instead of having to come into the agent's office. As described above, the benefits of this enhanced interaction between an insurance agent and customer caller, for example, include: (1) a faster and higher quality interaction that meets a need according to the customer caller's preferences; (2) improved communication between the customer caller and the insurance agent (or other insurance provider provider); and/or (3) a demonstration of the company's commitment to meeting customer callers' needs in a preferential way with the latest technology.

Certain examples are described herein as including logic or a number of components or modules. Modules may constitute either software modules, e.g., code embodied on a machine-readable medium or in a transmission signal, or hardware modules. A hardware module is a tangible unit capable of performing certain operations and may be configured or arranged in a certain manner. In example embodiments, one or more computer systems, e.g., a standalone, client or server computer system, or one or more hardware modules of a computer system, e.g., a processor or a group of processors, may be configured by software, e.g., an application or application portion, as a hardware module that operates to perform certain operations, as described herein.

In various examples, a hardware module may be implemented mechanically or electronically. For example, a hardware module may comprise dedicated circuitry or logic that is permanently configured, e.g., as a special-purpose processor, such as a field programmable gate array (FPGA) or an application-specific integrated circuit (ASIC), to perform certain operations. A hardware module may also comprise programmable logic or circuitry, e.g., as encompassed within a general-purpose processor or other programmable processor, that is temporarily configured by software to perform certain operations. It will be appreciated that the decision to implement a hardware module mechanically, in dedicated and permanently configured circuitry, or in temporarily configured circuitry, e.g., configured by software, or permanently configured to perform the relevant operations. Whether temporarily or permanently configured, such processors may constitute processor-implemented modules that operate to perform one or more operations or functions. The modules referred to herein may, in some examples, comprise processor-implemented modules.

Similarly, the methods or routines described herein may be fully, or at least partially, processor-implemented. For example, at least some of the operations of a method may be performed by one or more processors or processor-implemented hardware modules.

Unless specifically stated otherwise, discussions herein using words such as "processing," "computing," "calculating," "determining," "presenting," "displaying," or the like may refer to actions or processes of a machine, e.g., a computer, that manipulates or transforms data represented as physical, e.g., electronic, magnetic, or optical, quantities within one or more memories, e.g., volatile memory, non-volatile memory, or a combination thereof, registers, or other machine components that receive, store, transmit, or display information.

Alternative examples of the structures and methods illustrated herein may be employed without departing from the principles described herein. Thus, while particular examples and applications have been illustrated and described, it is to be understood that the disclosed examples are not limited to the precise construction and components disclosed herein. Various modifications, changes, and variations may be made in the arrangement, operation and details of the method and apparatus disclosed herein without departing from the spirit and scope defined in the appended claims.

What is claimed:

1. A computer-based method of responding to customer calls comprising:
   automatically determining, by one or more processors, whether at least one incoming call meets existing customer criteria;
   automatically determining, by the one or more processors, a market segment of the at least one incoming call; and
   based upon the determined market segment, automatically routing, by the one or more processors, the at least one incoming call to a customer call center gaming system having two-way video capability, wherein automatically routing, by the one or more processors, the at least one incoming call to the customer call center gaming system having two-way video capability further comprises offering the at least one incoming call an option to automatically connect, via the one or more processors, a gaming system having at least one of gesture, facial, or voice recognition technology and associated with the incoming call with the customer call center gaming system having two-way video capability to allow a face-to-face video interaction.

2. The method of claim 1, wherein the gaming system includes gesture, facial, and voice recognition technology without using any controller or headset.

3. The method of claim 1, wherein automatically determining, by the one or more processors, a market segment of the at least one incoming call comprises one of automatically determining the market segment is: (1) customers preferring no voice or face-to-face interaction with a representative after calling; (2) customers preferring face-to-face interaction with a representative after calling; or (3) customers preferring a voice only interaction with a representative after calling.

4. The method of claim 1, wherein automatically determining, by the one or more processors, whether at least one incoming call meets existing customer criteria comprises querying a database of customer information and automatically determining, by the one or more processors, a market segment of the at least one call comprises querying the database of customer information.

5. The method of claim 1, wherein automatically determining, by the one or more processors, whether at least one incoming call meets existing customer criteria comprises at least determining whether a phone number of the at least one incoming call matches a phone number of an existing customer.

6. The method of claim 1, wherein automatically determining, by the one or more processors, whether at least one incoming call meets existing customer criteria comprises querying a database of public data and automatically determining, by the one or more processors, a market segment of the at least one call using a set of business rules based upon the database of public data.

7. The method of claim 1, wherein automatically determining, by the one or more processors, a market segment of the at least one incoming call comprises automatically determining the market segment is customers preferring face-to-face interaction with a representative after calling.

8. The method of claim 1, wherein automatically determining, by the one or more processors, a market segment of the at least one incoming call comprises automatically determining the market segment is customers preferring a voice only interaction with a representative after calling.

9. A computer-based system of responding to customer calls, the system comprising:
   a communication network and one or more computing devices communicatively coupled to the communication network, each of the one or more computing devices having a memory and one or more processors;
   a customer call center including one or more of at least one processor, a memory, a transmitter, a receiver, and a gaming system having one or more of a two-way video device, a camera, a speaker, or a 3D scanning system; and
   a module stored in the memory of the customer call center and executable by at least the customer call center processor to:
   (1) automatically determine whether at least one incoming call meets existing customer criteria;
   (2) automatically determine a market segment of the at least one incoming call; and
   (3) based upon the determined market segment, automatically route the at least one incoming call to a customer call center gaming system having two-way video capability, wherein automatically routing the at least one incoming call to a customer call center gaming system having two-way video capability includes offering the at least one incoming call an option to automatically connect a gaming system having at least one of gesture, facial, or voice recognition technology and associated with the at least one incoming call with the customer call center gaming system having two-way video capability to allow a face-to-face video interaction.

10. The system of claim 9, each system including gesture, facial and voice recognition technology without using any controller or headset.

11. The system of claim 9, wherein the market segment includes a segment for: (1) customers preferring no voice or face-to-face interaction with a representative after calling; (2) customers preferring a face-to-face interaction with a representative after calling; and (3) customers preferring a voice only interaction with a representative after calling.

12. The system of claim 9, wherein the market segment includes a segment for customers preferring a face-to-face interaction with a representative after calling.

13. The system of claim 9, wherein the call center processor automatically determines whether at least one incoming call meets existing customer criteria by querying a database of customer information and automatically determines the market segment preferred by the incoming call by querying the database of customer information.

14. The system of claim 9, wherein the call center processor automatically determines whether at least one incoming call meets existing customer criteria by querying a database of public data and automatically determines the market segment of the at least one incoming call based upon a first set of business rules using the database of public data.

15. A computer-based method for responding to customer calls, the method comprising:
   automatically determining, by one or more processors, whether at least one incoming call meets existing customer criteria;
   automatically determining, by one or more processors, a market segment of the at least one incoming call is a segment of customers preferring a face-to-face interaction with a representative after calling; and
   automatically routing, by one or more processors, the at least one incoming call to a customer call center gaming system with two-way video capability, wherein automatically routing, by the one or more processors, the at least one incoming call to the customer call center gaming system having two-way video capability further comprises offering the at least one incoming call an option to automatically connect a gaming system having at least one of gesture, facial, or voice recognition technology and associated with the incoming call with the customer call center gaming system having two-way video capability to allow a face-to-face video interaction.

16. The method of claim 15, wherein each of automatically determining whether at least one incoming call meets existing customer criteria and automatically determining a market segment of the at least one incoming call comprises querying a database of customer information.

17. The method of claim 15, wherein automatically determining, by one or more processors, whether at least one incoming call meets existing customer criteria comprises querying a database of public data and automatically determining, by one or more processors, a market segment of the at least one incoming call comprises using a first set of business rules based upon the database of public data.

18. The method of claim 15, wherein the gaming system of the incoming call includes gesture, facial and voice recognition technology without using any controller or headset, allowing a face-to-face video call.

19. The method of claim 15, further comprising automatically determining whether the at least one incoming call wants a face-to-face interaction with the gaming system now or at a later time.

* * * * *